Nov. 7, 1967  C. R. JOHNSON ET AL  3,350,931
SYSTEM FOR MEASURING CHANGES IN FLUID PRESSURE
Filed May 12, 1965  2 Sheets-Sheet 1

INVENTORS
RAY RAYNOR &
CARLTON R. JOHNSON
BY Gary C. Honeycutt
ATTORNEY

RAY RAYNOR &
CARLTON R. JOHNSON   INVENTORS 3,350,931
SYSTEM FOR MEASURING CHANGES IN FLUID PRESSURE
Carlton R. Johnson, Tulsa, and Ray Raynor, Claremore, Okla., assignors to Esso Production Research Company, a corporation of Delaware
Filed May 12, 1965, Ser. No. 455,146
7 Claims. (Cl. 73—152)

ABSTRACT OF THE DISCLOSURE

A highly sensitive, bi-directional differential pressure transducer having a flexible diaphragm as the pressure sensing element in combination with a reference pressure cell and a reversible-flow, metering device for the transfer of fluid to the reference cell from a source of high pressure and from the reference cell to a location of low pressure to maintain the pressure transducer in a state of balance in response to signals generated by a controller.

---

This invention relates to the measurement of extremely small fluid pressure changes in an environment of high absolute pressure and is an improvement on the invention in our co-pending application Ser. No. 245,584, filed Dec. 18, 1962, now Patent No. 3,247,712, issued Apr. 26, 1966. The apparatus of the present invention provides a continuous, highly sensitive determination of small pressure changes as a function of time, over a wide range of cumulative change in absolute pressure. For example, an accurate record of pressure changes, sensitive to plus or minus 0.0005 p.s.i., is obtained at absolute pressures of 3,000 p.s.i. or greater.

A preferred embodiment of the invention includes a highly sensitive, bi-directional differential pressure transducer, having a flexible diaphragm as the pressure-sensing element, in combination with a reference pressure cell. The sensing element of the transducer is exposed on one side to the pressure source wherein small changes are to be measured, and is exposed on the other side to the pressure of the reference cell. Means are provided to vary the reference cell pressure in response to pressure differences detected by the transducer, whereby an accurate balance of pressures is maintained between the pressure of the reference cell and the source pressure.

The means for continuously varying or regulating the reference cell pressure includes an auxiliary source of fluid pressure having an absolute pressure level somewhat greater than that of the pressure source wherein small differential changes are to be determined. A transfer of fluid from said auxiliary source to the reference pressure cell, during periods of increasing pressure, is controlled by a positive displacement metering device driven solely by the difference in pressure between the auxiliary source and the reference cell. Means are provided for reversing the direction of flow through the metering device during periods of declining pressure, whereby an accurate measure of fluid volume removed from the reference cell is obtained. In order that the metering device may be driven solely by pressure difference, a pressure sink must be provided to receive fluid from the reference cell during such periods of declining pressure. The record of fluid volumes transferred to and from the reference cell is readily calibrated to provide the desired record of small variations in the pressure source.

An alternate embodiment of the invention also includes a highly sensitive, bi-directional differential pressure transducer having a flexible diaphragm as the pressure-sensing element, in combination with a reference pressure cell. Initially, the sensing of the transducer is exposed on one side to the pressure source wherein small changes are to be measured, and is exposed on the other side to the pressure of the reference cell. Unlike the previously described embodiment, means are provided for intermittently reversing the exposure of the transducer diaphragm, whereby the side of the transducer diaphragm which was initially exposed to the pressure source is then exposed to the pressure of the reference cell; and the opposite side of the diaphragm, which was initially exposed to the pressure of the reference cell, is then exposed to the source pressure wherein small pressure changes are to be measured. In this manner, the differential pressure transducer itself serves as a metering device to provide a continuous, accurate record of fluid volumes transferred to the pressure cell during periods of increasing pressure, and the volumes transferred from the pressure cell during periods of declining pressure, in the source being measured.

Figures 1, 2:
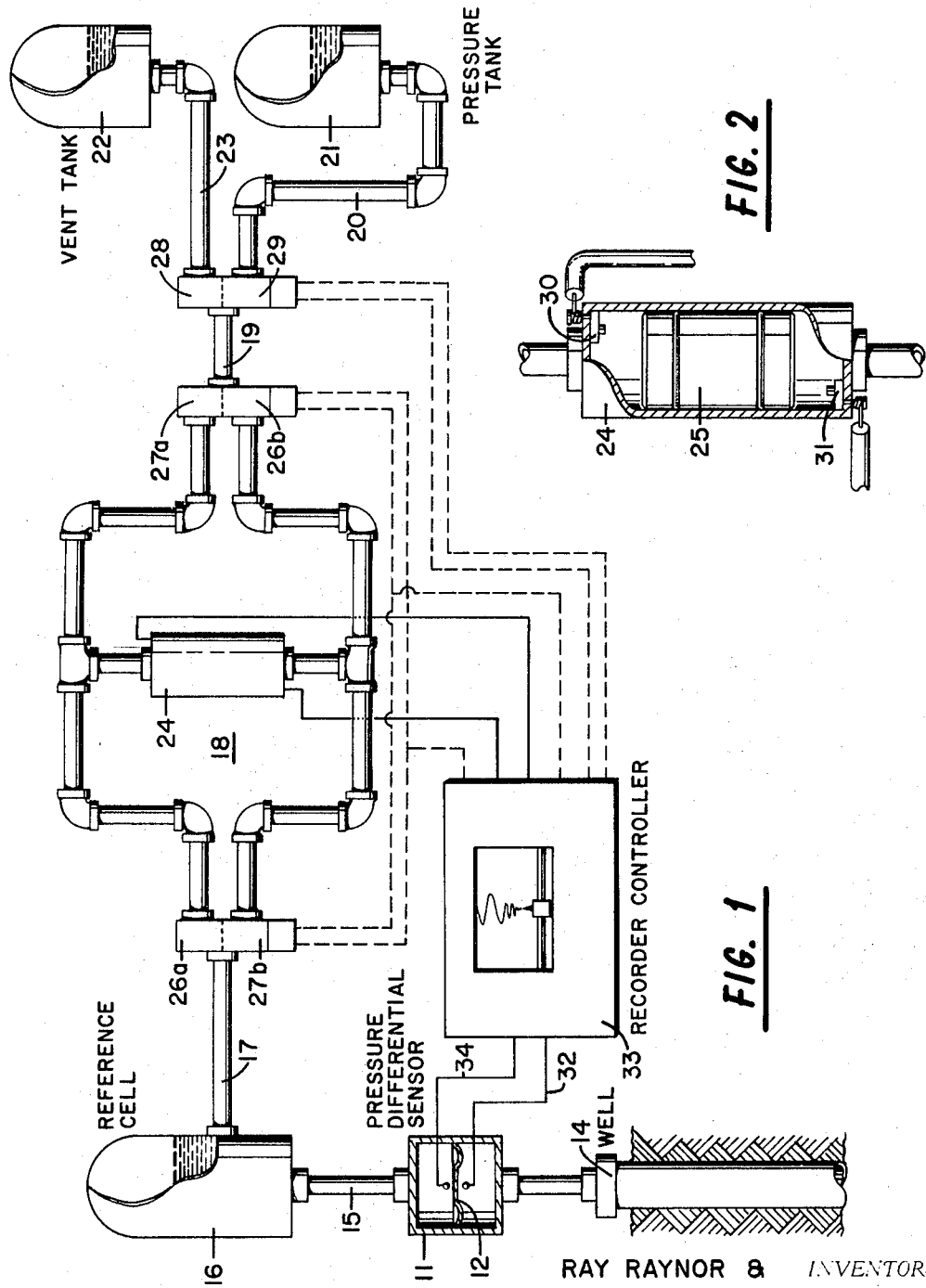
FIGURE 1 is a schematic diagram showing the various components of a preferred embodiment of the invention, and the relationship between the parts.
FIGURE 2 is a cutaway elevational view, partially in cross-section, showing in further detail a portion of the metering device of the embodiment of FIGURE 1.

Referring particularly to FIGURE 1, the system of the invention is seen to include a highly sensitive, bi-directional differential pressure transducer 11, the pressure-sensing element of which consists essentially of flexible diaphragm 12. One side of diaphragm 12 is exposed to the pressure of well 14, which, for purposes of illustration, represents any source of high absolute pressure wherein small variations are to be determined as a function of time. The other side of diaphragm 12 is exposed by means of conduit 15 to the pressure of reference cell 16.

Reference cell 16 is also connected, by means of conduit 17, metering device 18, conduit 19, valve 29, and conduit 20, with an auxiliary fluid supply vessel 21 pressurized to a level substantially above the maximum pressure which is likely to be experienced in well 14. Vessel 22, connected with reference cell 16 by means of conduits 23 and 19, valve 28, metering device 18, and conduit 17, serves as a pressure sink to receive fluid from cell 16 during periods of declining pressure in well 14. Valves 28 and 29 in combination with conduit 19 make up a cross-over assembly which in a manner more fully described hereinafter provides alternate fluid communication between the metering device 18 and the vent tank 22 or the auxiliary pressure cell 21. Vessels 21 and 22, conduits 20 and 23, and cross-over assembly make up a pressure equalization assembly which in a manner more fully described hereinafter performs the function of maintaining the transducer 12 in a state of balance.

Metering device 18, as shown in FIGURE 2, includes cylinder 24, containing a free piston 25 and micro switches 30 and 31. Solenoid-operated valves 26a, 26b, 27a and 27b (FIGURE 1) control the direction of motion of piston 25 within cylinder 24. Switches 30 and 31, mounted at opposite ends of cylinder 24, indicate the position of piston 25 as it reaches the limit of its stroke at either end of cylinder 24.

In operation, an exact balance of pressure is initially established between well 14 and reference cell 16, as indicated by transducer 11. Any subsequent variations in pressure which occur in well 14 are indicated by a deflection of diaphragm 12. Downward deflection, indicating a decline of pressure in the well, is detected by conventional means and supplied by line 32 to recorder-controller 33. Upward deflection, indicating increased pressure in the well, is transmitted to the recorder-controller by line 34.

In response to a signal received via line 32, the relay system of controller 33 transmits a signal opening valve 28 while valve 29 remains closed, whereby the excess pressure in reference cell 16 is accurately metered into vent tank 22. Depending upon which one of switches 30 and 31 has most recently been closed by piston 25, flow from reference cell 16 to vent tank 22 may pass through either valve pair 26a and 26b or pair 27a and 27b. Flow through the former valve pair corresponds to a downward motion of piston 25, whereas flow through the latter valve pair corresponds to an upward motion of piston 25.

If piston 25 reaches the limit of its stroke in one direction and thereby closes either of switches 30 and 31, a signal is transmitted to recorder-controller 33, in response to which the positions of each of valves 26a, 26b, 27a, and 27b is reversed, whereby the continued transfer of fluid from reference cell 16 to vent tank 22 may continue, with piston 25 moving in the opposite direction.

Once the absolute pressure of reference cell 16 is restored to a level which exactly balances the pressure of well 14, diaphragm 12 is returned to its neutral or null position. In this event, all valves are closed whereby no transfer of fluid to or from reference cell 16 may occur.

In the event of increasing pressure in well 14, diaphragm 12 is deflected upward whereby a signal is transmitted via line 34 to recorder-controller 33, in response to which valve 29 is opened while valve 28 remains closed. A transfer of fluid from pressure tank 21 to reference cell 16 is thereby permitted. Such flow may initially pass through valves 26b and 26a or through valves 27a and 27b, depending as before upon which one of switches 30 and 31 was most recently closed by piston 25. The transfer of fluid from pressure tank 21 to reference cell 16 through valves 26b and 26a corresponds to an upward movement of piston 25 within cylinder 24, whereas flow through valves 27a and 27b corresponds to a downward motion of piston 25.

If piston 25 is initially displaced upward and the transfer of fluid from tank 21 to reference cell 16 is continued until piston 25 closes switch 30, the relay system of recorder-controller 33 will permit valve pair 26a and 26b to close and will open valve pair 27a and 27b, thereby causing piston 25 to be displaced downward with a continued transfer of fluid from pressure tank 21 to reference cell 16.

As before, once the pressure of reference cell 16 is restored to a level which exactly equals the pressure of well 14, diaphragm 12 is returned to its neutral position whereby all valves are returned to the closed position, thereby permitting no further transfer of fluid to or from reference cell 16.

Figure 3:
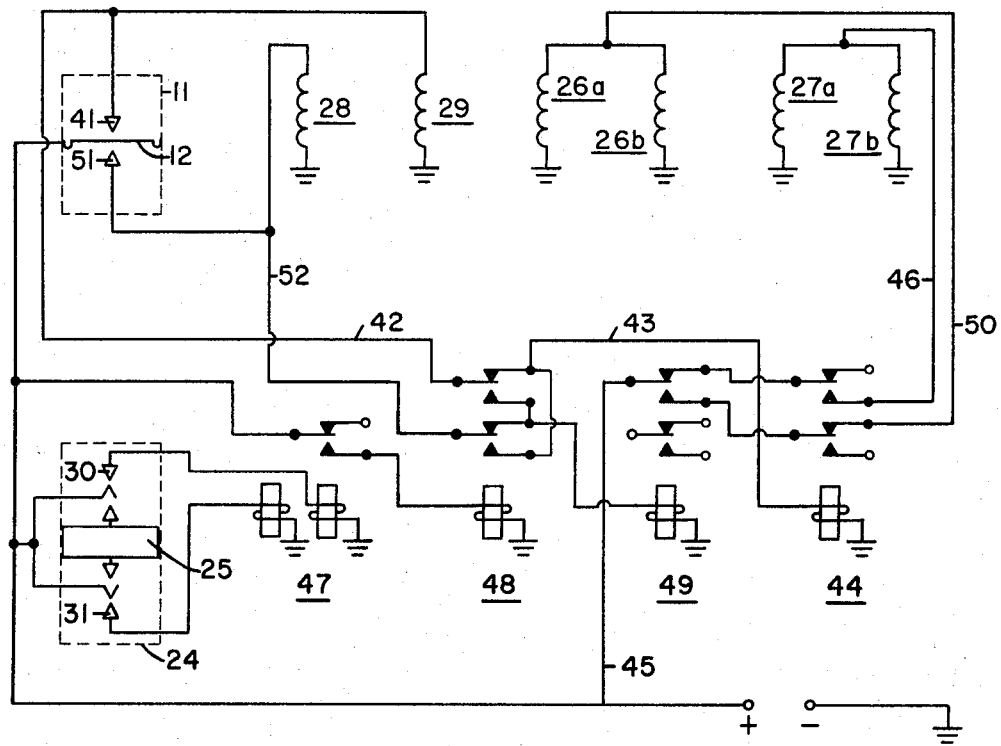
FIGURE 3 is an electrical diagram showing an example of suitable control means for the automatic operation of the embodiment of FIGURE 1.

In FIGURE 3, a suitable system of relays is shown for controlling the operation of valves 26a, 26b, 27a, 27b, 28 and 29 in response to deflections of diaphragm 12 and in response to the momentary closing of switches 30 and 31 as piston 25 reaches the limit of its stroke in either direction.

During a period of increasing borehole pressure, diaphragm 12 is deflected upward until contact is made with terminal 41, thereby energizing the solenoid which opens valve 29 and also completing a circuit by way of lines 42 and 43, energizing relay 44. The energized position of relay 44 completes a circuit by way of lines 45 and 46, thereby energizing the solenoids which open valve pair 27a and 27b, while valve pair 26a and 26b remains closed.

The open position of relay 47, as shown, indicates that piston 25 is moving upward after having momentarily closed switch 31. If piston 25 reaches the upper limit of its stroke and closes switch 30, while diaphragm 12 remains deflected upward, relay 47 is closed, thereby energizing relay 48. Current from line 42 is now passed to relay 49 while relay 44 is returned to a relaxed position. Current from line 45 is then passed by way of line 50 to the solenoids which open valve pair 26a and 26b, while valves 27a and 27b are closed. This reversal of valve pairs permits a continued transfer of fluid from pressure tank 21 to reference cell 16, with piston 25 now being displaced downward.

During a period of decreasing borehole pressure, diaphragm 12 is deflected downward until contact is made with terminal 51. A circuit is thereby completed which energizes the solenoid of valve 28, thereby permitting a transfer of fluid from the reference cell to vent tank 22. A circuit is also completed by way of line 52 and relay 48 which energizes relay 49 or relay 44, depending upon the direction in which piston 25 is being displaced. Suppose, for example, that piston 25 is being displaced upward after having momentarily closed switch 31. In that event, relays 47 and 48 are both relaxed, thereby directing the flow of current in line 52 to energize relay 49, thereby opening valves 26a and 26b, while 27a and 27b are closed.

If, instead, piston 25 is being displaced downward after having momentarily closed switch 30, then relays 47 and 48 remain energized, thereby directing current from line 52 through relay 48 and line 43 to energize relay 44. A circuit is completed through line 45, relay 49, and line 46, thereby opening valves 27a and 27b, while valves 26a and 26b remain closed.

Figure 4:
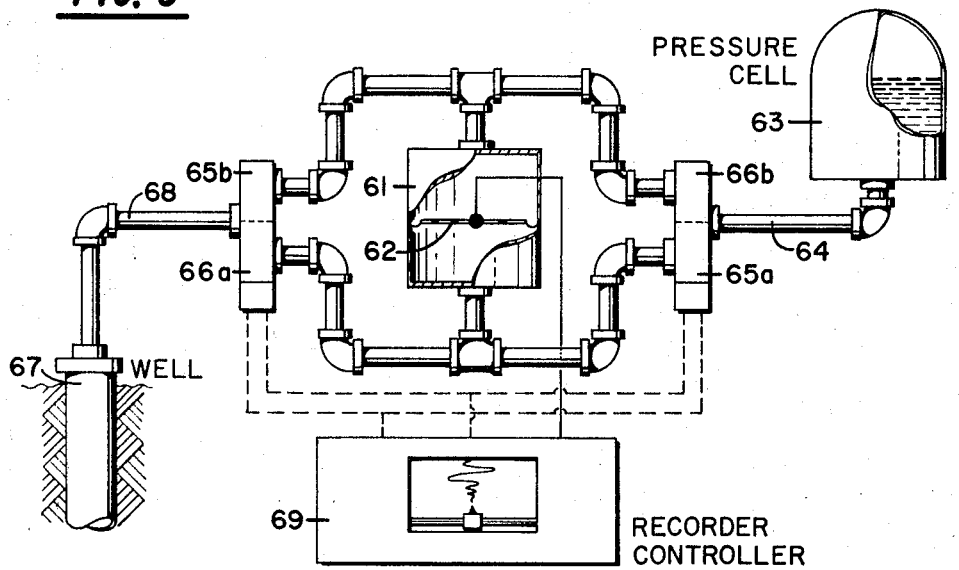
FIGURE 4 shows an alternate, simplified embodiment based upon a principle of operation which differs somewhat from the embodiment of FIGURE 1.

The embodiment of FIGURE 4 also includes a highly sensitive, bi-directional, differential pressure transducer 61, the pressure-sensing element of which consists essentially of flexible diaphragm 62. Fluid communication is established between pressure cell 63 and one side of diaphragm 62 by means of conduit 64 and valve 65a. Fluid communication is provided between pressure cell 63 and the other side of diaphragm 62 by means of conduit 64 and valve 66b.

Fluid communication between well 67 and one side of diaphragm 62 is provided by means of conduit 68 and valve 65b. Fluid communication between well 67 and the other side of diaphragm 62 is provided by means of conduit 68 and valve 66a.

In this embodiment, transducer 61 serves as both a pressure-sensing element and as a metering device to provide a continuous, accurate record of fluid volumes transferred to and from pressure cell 63 in response to small pressure changes which occur in well 67. Initially, an exact balance of pressures is established between well 67 and pressure cell 63 by opening each of valves 65a, 65b, 66a, and 66b. With each of the valves open, no pressure differential can be developed across diaphragm 62. The measurement of differential pressure changes in well 67 is begun, for example, by closing valve pair 65a and 65b. The pressure of well 67 is thereby exposed to the lower side of diaphragm 62, whereas the pressure of reference cell 63 is exposed to the upper side of the diaphragm. Any increase of pressure within well 67 deflects diaphragm 62 upward, thereby displacing a small volume of fluid through valve 66b into pressure cell 63. In the event of a continued pressure rise in well 67, diaphragm 62 is soon deflected to the limit of its sensitive upward range. When the transducer output reaches a predetermined maximum corresponding to the deflection limit of diaphragm 62, a relay system in recorder-controller 69 reverses the valve positions; that is, valve pair 65a and 65b is opened and valve pair 66a and 66b is closed. The upper side of diaphragm 62 is now exposed to the pressure of well 67, whereas the lower side thereof is exposed to the pressure of reference cell 63. Therefore, a continued rise of pressure in well 67 causes a downward deflection of diaphragm 62, accompanied by a continued transfer of fluid into pressure cell 63 through valve 65a.

If the pressure in well 67 continues to rise, diaphragm 62 soon reaches the limit of its sensitive downward deflection range. The relay system of recorder-controller 69 is again triggered, reversing the valve positions, thereby reversing the direction in which diaphragm 62 is displaced, and so on repeatedly.

Similarly, during periods of declining pressure in well 67, small volumes of fluid are transferred from pressure cell 63, through the respective valve pairs, and into the well. As the output from transducer 61 reaches a predetermined maximum or minimum corresponding to the upper and lower limits, respectively, of the sensitive deflection range of diaphragm 62, the positions of the valve pairs are again coordinated by the relay system of recorder-controller 69.

A continuous record is kept of the valve pair positions as a function of time. A record is also kept of the deflection reversals undergone by diaphragm 62 as the output of transducer 61 reaches a predetermined maximum or minimum output. The record of valve positions and diaphragm deflections is readily calibrated to provide a continuous record of differential pressure changes experienced within well 67. Specifically, a calibration may be provided by first determining the volume of fluid displaced by diaphragm 62 in moving from a predetermined limit of deflection in one direction, to a predetermined limit of deflection in the opposite direction. (The record of valve positions indicates whether the fluid volumes displaced by diaphragm 62 are being added to pressure cell 63 or removed therefrom.) This information, together with an accurate measurement of the initial gas-filled volume of pressure cell 63, permits a calculation of pressure changes, since the pressure-volume product of the gas-filled volume of the pressure cell remains constant at constant temperature.

It will be apparent that the sensitivity of the system depends not only upon the inherent sensitivity of transducer 61, but also upon the gas-filled volume of pressure cell 63. If the gas-filled volume is extremely small, the occurrence of small changes in pressure in well 67 will cause little or no deflection of diaphragm 62, since a large pressure change would be necessary to significantly change the gas-filled volume of cell 63.

On the other hand, an extremely large gas-filled volume in pressure cell 63 is undesirable, since relatively small pressure changes in the well will cause a substantial transfer of fluid to or from the cell. While it may be said that greater sensitivity is thus provided, the apparent benefit of great sensitivity is offset by the fact that a transfer of fluid to or from the well imposes a spurious pressure change in the well.

We claim:
1. A reversible-flow, liquid metering device comprising:
   (a) a chamber having first and second sections separated by a a member which is reversibly displaceable between two limits in the chamber in response to a pressure differential between the first and second sections;
   (b) a first flow conduit interconnecting the first section of the chamber with a first and second pressure source;
   (c) a second flow conduit interconnecting the second section of the chamber with the first and second pressure source;
   (d) means for controlling the flow of fluid in the first flow conduit alternately between the first and second pressure sources;
   (e) means for controlling the flow of liquid in the second flow conduit alternately between the first and second pressure sources;
   (f) means in the chamber for sensing displacement of the member between the two limits in the chamber;
   (g) means for sensing a reversal of pressure at the first pressure source;
   (h) means for actuating the flow control means in response to a limited displacement of the displaceable member so that flow of liquid between the sources is maintained in one direction independent of the direction of movement of the displaceable member; and
   (i) means for actuating the flow control means in response to a sensed pressure reversal at the first pressure source so that direction of flow is reversed upon reversal of the pressure at the first pressure source.

2. The device as defined in claim 1 further comprising:
   (a) means for recording each limiting displacement of the displaceable member; and
   (b) means for recording each reversal of the pressure at the first pressure source.

3. An apparatus for measuring small differential pressure changes in a well having a wellhead which comprises:
   (a) a differential pressure transducer at the surface of the earth and connected on one side to the wellhead, including means for generating a first signal indicative of rising pressure and a second signal indicative of falling pressure;
   (b) a reference pressure cell having a pressure substantially the same as the wellhead pressure;
   (c) a conduit providing pressure communication between the other side of the differential pressure transducer and the reference cell;
   (d) an auxiliary pressure source having a substantially higher absolute pressure than the wellhead pressure;
   (e) means interconnecting the auxiliary pressure source and the reference cell for transferring an accurately metered volume of liquid from the auxiliary source to the reference cell in response to said first signal; and
   (f) means connected to the reference cell for venting an accurately metered volume of liquid from the reference cell in response to said second signal.

4. The apparatus as defined in claim 3 further comprising:
   (a) means for recording the volume of liquid transferred from the auxiliary source to the cell; and
   (b) means for recording the volume of liquid vented from the cell.

5. An apparatus for measuring small differential pressure changes in a well having a wellhead which comprises:
   (a) a reference pressure cell initially charged to the pressure level of the wellhead;
   (b) a bi-directional, differential-pressure transducer connected on one side to the wellhead and on the other side to the reference pressure cell;
   (c) an auxiliary pressure cell charged to a pressure substantially above the pressure of the reference pressure cell;
   (d) a vent tank having a pressure less than the pressure of the reference pressure cell;
   (e) a cylindrical metering chamber;
   (f) a free piston dividing the chamber into first and second sections;
   (g) means for establishing fluid communication between either the first section or the second section of the cylindrical vessel and either the auxiliary pressure cell or the vent tank;
   (h) means for establishing fluid communication alternately between the first and second sections of the cylindrical vessel and the reference pressure cell whereby pressure differentials between the auxiliary pressure cell and the reference pressure cell cause displacements of the piston within the cylindrical chamber;
   (i) means for indicating a pre-determined degree of displacement of the piston within the cylindrical chamber;
   (j) means for reversing fluid communication between the first section and the second section of the cylindrical chamber with respect to the reference pressure cell and the auxiliary pressure cell or the vent tank, as the case may be, in response to the indication of a pre-determined degree of displacement of the piston within the cylindrical chamber;

(k) means for recording the displacement of the transducer; and (l) means for recording each reversal of fluid communication between the first and second sections of the metering chamber.

6. An apparatus for measuring small differential pressure changes in a well having a wellhead which comprises:

(a) a reference pressure cell;

(b) a bi-directional, differential-pressure transducer, the transducer connected between said reference pressure cell and the wellhead of said well to detect differential pressures between the wellhead and reference cell;

(c) a reversible, positive-displacement metering means having first and second fluid ports disposed upon opposite sides of the metering means;

(d) a pressure equalization assembly;

(e) a first conduit connecting the first and second fluid ports of the displacement metering means to the reference pressure cell;

(f) a second conduit connecting the first and second fluid ports of the reversible positive displacement metering means to the pressure equalization assembly;

(g) valve means in the first and second conduit means operable in the first condition to connect the first of the ports to the reference pressure cell and the second of the ports to the pressure equalization assembly and in a second condition to connect the first of the ports to the pressure equalization assembly and the second of the ports to the reference pressure cells; and (h) control means responsive to the output of the transducer to reverse the condition of the valve means upon reversal of the differential pressures detected the transducer.

7. An apparatus for measuring small differential pressure changes in a well having a wellhead comprising:

(a) a reference pressure cell initially charged to the pressure level of the wellhead;

(b) a bi-directional, differential-pressure transducer connected between the wellhead and the reference pressure cell;

(c) an auxiliary pressure cell charged to a pressure substantially above the pressure of the reference cell;

(d) a vent tank having a pressure less than the pressure of the reference cell;

(e) a cylindrical liquid metering chamber having first and second sections separted by a member which is reversibly displaceable between two limits in the chamber in response to a pressure differential between the first and second section;

(f) a first liquid flow conduit interconnecting the first section of the chamber with the reference cell;

(g) a second liquid flow conduit interconnecting the second section of the chamber with the reference cell;

(h) a cross-over assembly interconnecting the vent tank and auxiliary pressure cell with the first and second liquid flow conduits, including means for alternately providing flow communication from the vent tank or auxiliary cell to the first and second flow conduits;

(i) means in the first liquid flow conduit for controlling the flow of liquid from the metering chamber alternately between the reference cell and the cross-over assembly;

(j) means in the second liquid flow conduit for controlling the flow of liquid from the metering chamber alternately between the reference cell and the cross-over assembly;

(k) means in the chamber for sensing displacement of the member between the two limits in the chamber;

(l) means in the transducer for sensing a reversal of pressure across the transducer;

(m) means for actuating the flow control means in the first and second conduits in response to a limited displacement of the displaceable member so that flow of liquid between the reference cell and cross-over assembly is maintained in one direction of movement of the displaceable member;

(n) means for actuating the flow control means in the first and second conduits and the flow control means in the cross-over assembly in response to a sensed pressure reversal at the transducer so that the direction of flow of liquid between the reference cell and cross-over assembly is reversed upon reversal of the pressure at the transducer;

(o) means for recording each limiting displacement of the displaceable member; and (p) means for recording each reversal of pressure at the transducer.

References Cited
UNITED STATES PATENTS

| | | | |
|---|---|---|---|
| 1,932,976 | 10/1933 | Lamb et al. | 73—250 |
| 2,032,007 | 2/1936 | Fee | 92—1 X |
| 2,755,966 | 7/1956 | Lindars | 73—250 X |
| 3,247,712 | 4/1966 | Johnson et al. | 73—152 |

FOREIGN PATENTS

| | | |
|---|---|---|
| 403,465 | 9/1925 | Germany. |
| 414,035 | 5/1925 | Germany. |

LOUIS R. PRINCE, *Primary Examiner.*

DONALD O. WOODIEL, *Assistant Examiner.*